US011126506B2

(12) United States Patent
Martynov et al.

(10) Patent No.: US 11,126,506 B2
(45) Date of Patent: Sep. 21, 2021

(54) SYSTEMS AND METHODS FOR PREDICTIVE DATA PROTECTION

(71) Applicant: Acronis International GmbH, Schaffhausen (CH)

(72) Inventors: Dmitry Martynov, Moscow (RU); Stanislav Protasov, Moscow (RU); Serguei Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 45 days.

(21) Appl. No.: 16/533,103

(22) Filed: Aug. 6, 2019

(65) Prior Publication Data

US 2020/0042398 A1 Feb. 6, 2020

Related U.S. Application Data

(60) Provisional application No. 62/714,974, filed on Aug. 6, 2018.

(51) Int. Cl.
*G06F 12/00* (2006.01)
*G06F 11/14* (2006.01)
*G06N 20/00* (2019.01)

(52) U.S. Cl.
CPC ...... *G06F 11/1451* (2013.01); *G06F 11/1464* (2013.01); *G06F 11/1469* (2013.01); *G06N 20/00* (2019.01); *G06F 2201/805* (2013.01)

(58) Field of Classification Search
CPC ............. G06F 11/1451; G06F 11/1464; G06F 11/1469; G06F 2201/805; G06N 20/00
See application file for complete search history.

(56) References Cited

U.S. PATENT DOCUMENTS

| 8,051,044 | B1* | 11/2011 | Dyatlov | G06F 11/1451 |
| | | | | 707/646 |
| 8,244,678 | B1* | 8/2012 | Hartland | G06F 11/1448 |
| | | | | 707/640 |
| 2003/0229653 | A1* | 12/2003 | Nakanishi | G06F 11/1451 |
| 2005/0246575 | A1* | 11/2005 | Chen | G06F 11/2076 |
| | | | | 714/6.12 |
| 2010/0274983 | A1* | 10/2010 | Murphy | G06F 11/1448 |
| | | | | 711/162 |
| 2011/0145528 | A1* | 6/2011 | Watanabe | G06F 3/0605 |
| | | | | 711/162 |

(Continued)

*Primary Examiner* — John A Lane
(74) *Attorney, Agent, or Firm* — Arent Fox LLP; Michael Fainberg

(57) ABSTRACT

Disclosed herein are systems and method for method for predictive data protection. In one aspect, an exemplary method comprises selecting data stored on a computing device for backing up, according to a predetermined schedule for performing a backup; collecting features associated with the computing device where the data for the backup is stored, the features comprising device information for the computing device, user information for a user of the data, and external information associated with a locale of the computing device; analyzing the features to determine a set of backup parameters for the backup, wherein the backup parameters comprise scheduling parameters and destination storage parameters; generating a backup plan based on the set of parameters for performing the backup; and performing the backup of the data according to the backup plan.

17 Claims, 9 Drawing Sheets

(56) References Cited

U.S. PATENT DOCUMENTS

| | | | |
|---|---|---|---|
| 2014/0201137 A1* | 7/2014 | Vibhor | G06F 16/275 |
| | | | 707/610 |
| 2014/0289202 A1* | 9/2014 | Chan | H04L 69/04 |
| | | | 707/652 |
| 2016/0162364 A1* | 6/2016 | Mutha | G06F 11/3476 |
| | | | 707/645 |
| 2018/0018108 A1* | 1/2018 | Hammons | G06F 11/3034 |
| 2018/0107564 A1* | 4/2018 | Henry | G06F 11/1466 |
| 2019/0370126 A1* | 12/2019 | Dutch | G06F 11/1464 |
| 2020/0236121 A1* | 7/2020 | Spurlock | G06F 11/1456 |
| 2020/0278901 A1* | 9/2020 | Singh | G06N 5/048 |

\* cited by examiner

SYSTEMS AND METHODS FOR PREDICTIVE DATA PROTECTION

CROSS-REFERENCE TO RELATED APPLICATIONS

This application claims the benefit to U.S. Provisional Application No. 62/714,974, filed on Aug. 6, 2018, the contents of which is hereby incorporated by reference in its entirety.

FIELD OF TECHNOLOGY

The present disclosure generally relates to the field of electronic data storage, and, more specifically, to systems and methods for predictive data protection.

BACKGROUND

Users often store private, confidential and valuable data on their computing devices. For example, users may store photos, office documents, financial documents and the like on their mobile devices, laptops, desktop PCs, in cloud storage and the like. In each of these cases, there is a risk of data loss associated with a file or files. Data loss can be harmful to users and businesses if not quickly identified and contained. To prevent data loss, users and businesses often rely on backing up their important data to a storage server or local and/or remote storage device.

However, it is difficult for users and businesses to preemptively plan for data loss because data loss is, by its nature, unpredictable. Proactively identifying risks of data loss can prevent outage escalations and stop outages from negatively impacting business operations. Moreover, if users are performing backups across an enterprise network, the backups are not being performed systematically with storage resources in mind. Instead, uncoordinated backups from various users in the enterprise may lead to increased network congestion, over-utilization of particular resources accompanied with under-utilization of other resources, highlighting an inconsistent backup policy. These problems have not been addressed by the technology currently available.

Accordingly, there is a need for a system and method for predictive data protection.

SUMMARY

The present disclosure provides an effective solution for the foregoing problems of conventional techniques associated with data backup. Disclosed are example systems, methods and computer program products for predictive data protection.

In an exemplary aspect, a method for predictive data protection, comprising: selecting data stored on a computing device for backing up, according to a predetermined schedule for performing a backup; collecting features associated with the computing device where the data for the backup is stored, the features comprising device information for the computing device, user information for a user of the data, and external information associated with a locale of the computing device; analyzing the features to determine a set of backup parameters for the backup, wherein the backup parameters comprise scheduling parameters and destination storage parameters; generating a backup plan based on the set of parameters for performing the backup; and performing the backup of the data according to the backup plan.

In one exemplary aspect, the features comprise locale, hardware configuration (HDD/SSD, top-notch/medium class), location, device type: notebook/PC, time zone, OS, the amount of data utilized, helicopter view stats.

In one exemplary aspect, the scheduling parameters comprise one or more of: how often to backup and granularity and the destination storage parameters comprise targets for the destination storage of the backup archives.

In one exemplary aspect, the method further comprising: aggregating backup and restore operations of the computing device with other computing devices within one or more networks; identifying patterns within the backup and restore operations; and generating the backup plan based on the patterns.

In one exemplary aspect, the method further comprising: estimating a risk of data loss based on a set of risk variables related to user data, device data and environment data; and suggesting a modification to the backup plan based on the risk of data loss.

In one exemplary aspect, the set of variables comprises one or more of network device information, streaming data, computer sensor data and user behavior data.

In one exemplary aspect, the method further comprising: determining access patterns of the data by a user of the computing device; and automatically backup the data according to the access patterns.

In one exemplary aspect, the method further comprising: classifying an importance of the data based on at least the access patterns; and selecting a storage tier according to the importance.

In one exemplary aspect, system for predictive data protection, comprising: a processor configured to: select data stored on a computing device for backing up, according to a predetermined schedule for performing a backup; collect features associated with the computing device where the data for the backup is stored, the features comprising device information for the computing device, user information for a user of the data, and external information associated with a locale of the computing device; analyze the features to determine a set of backup parameters for the backup, wherein the backup parameters comprise scheduling parameters and destination storage parameters; generate a backup plan based on the set of parameters for performing the backup; and perform the backup of the data according to the backup plan.

In one example aspect, a non-transitory computer readable medium storing thereon computer executable instructions for predictive data protection, including instructions for: selecting data stored on a computing device for backing up, according to a predetermined schedule for performing a backup; collecting features associated with the computing device where the data for the backup is stored, the features comprising device information for the computing device, user information for a user of the data, and external information associated with a locale of the computing device; analyzing the features to determine a set of backup parameters for the backup, wherein the backup parameters comprise scheduling parameters and destination storage parameters; generating a backup plan based on the set of parameters for performing the backup; and performing the backup of the data according to the backup plan.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for predictive data protection. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As described herein, a method and system for predictive data protection may be used for modifying configuration of data storage systems, such as an online/remote file storage service or cloud computing service. Examples of such services include Amazon® Simple Storage Service ("S3"), and Microsoft® Azure Blob ("Azure").

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Figure 1:
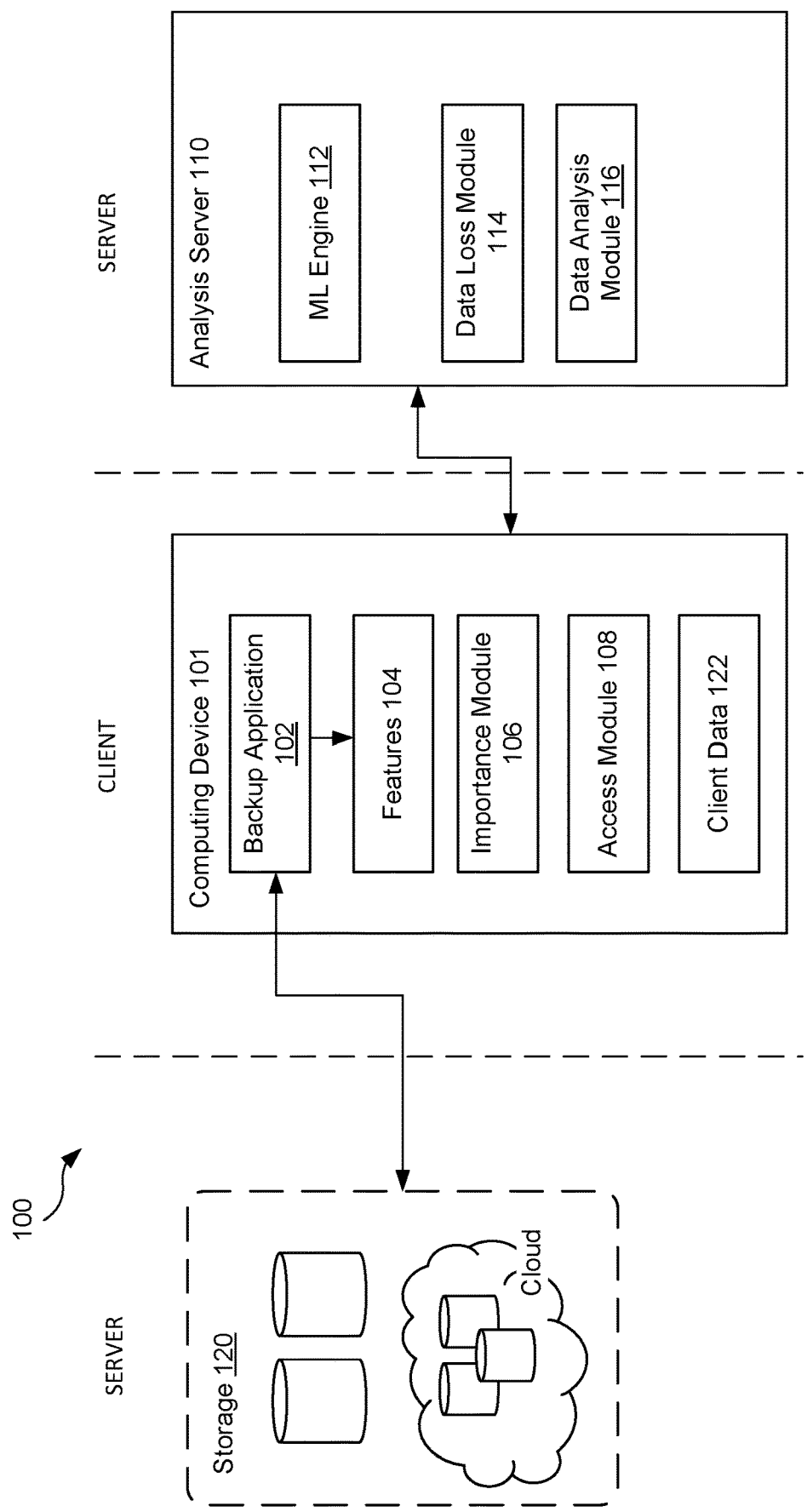
FIG. 1 illustrates a block diagram of a system for predictive data protection in accordance with exemplary aspects of the present disclosure.

FIG. 1 illustrates a block diagram of a system 100 for predictive data protection in accordance with exemplary aspects of the present disclosure.

The system 100 comprises several components, which may be located within the same network, or across several distributed networks. Specifically, the client side comprises computing device 101 that is used by a user in, for example, a business enterprise, for carrying out business tasks or the like. The computing device 101 may be used to locally store working files that a user is working on. In exemplary aspects, the computing device 101 uses the storage system 100 on the server side to store client data 122 on a periodic or scheduled bases. The computing device 101 may, in some aspects, utilize services of the analysis server 110 on the server side to aid in generating predictive backups.

The computing device 101 comprises, at least, a backup application 102, an importance module 106, an access module 108 and client data 122 among other user applications, application data, system data and the like. The computing device 101 may be a desktop computer, a laptop computer, a tablet computer, a mobile device, or any computer used in an enterprise environment. The backup application 102 performs backup and restore operations that are iterative, complete, or a combination of both, on client data 122 (or other data, such as the user applications, application data, system data and the like). The backup application 102 determines, or collects, various features 104 relating to the computing device 101. In some aspects, the backup application 102 analyzes the features 104 to determine a set of backup parameters for the client data 122. The backup parameters are then used to generate a backup plan to back-up the client data 122, the backup plan configured to optimally store the collected features of the computing device 101. In some cases, the analysis of the features is aided by the data analysis module 116 which provides predictions for features of the computing device based on features of other similar computing devices and the types of backup parameters associated with similar features. In some aspects, the backup parameters include parameters related to regularity of backup, granularity of backup, target destinations for the backup and the like. According to one aspect, the importance module 106, the access module 108, the data loss module 114 and the data analysis module 116 are distinct modules of the backup application 102, while in other instances, these modules are distinct from the backup application 102.

In some aspects, the backup plan generated by the backup application 102 may be suggested to one or more users of the computing device 101. In another aspect, the backup plan is suggested to an administrator of the computing device 101, or the administrator of the network of the computing device 101. In one aspect, the generated backup plan is automatically applied to the client data 122 (and/or other data from computing device 101) and the backup application 102 stores the client data 122 (and/or other data) based on the generated backup plan to storage 120 accordingly.

The backup application 102 may generate a predictive backup plan by considering access patterns of the client data 122 using the access module 108. For example, if certain data is accessed more than a threshold amount of times in a day, it may be backed up several times per day, while other data that is not viewed as often is backed up, respectively, less often. Additionally, the backup application 102 may consider importance of the client data 122 as provided by the importance module 106, when generating or suggesting the backup plan.

Further, the backup application 102 receives or requests analysis data from the analysis server 110. The analysis server 110 comprises an ML Engine 112, a Data Loss Module 114 and a Data Analysis Module. The ML Engine 112 aggregates backup and restore operations that are performed by the backup application 102 on computing device 101, across all devices in a particular logical group, e.g., all devices owned by a single company, a group of companies, or across all devices with particular backup software installed thereon. By clustering the backup and restore operations, the ML Engine 112 finds similarities in the entire collection of devices protected by the backup application, within a network, or within a company. The ML engine 112 then identifies patterns and can predict and suggest backup plans that are optimized for the patterns to the backup application 102, or suggest modifications to the backup application 102 to optimize the backup plans based on the identified patterns.

Moreover, the backup application 102 may generate a risk value for data loss of the computing device 101 by requesting or receiving a loss analysis by the data loss module 114. According to one aspect, the data loss module 114 is hosted on the analysis server 110, however those of ordinary skill in the art will recognize that the data loss module 114 may also be collocated with the computing device 101, or may even be a part of the backup application 102. In some aspects, the portion of the data loss module 114 located on the server side estimates the risk of data loss for computing devices similar to computing device 101 and for data similar to client data 122, aiding the backup application 102 in generating the risk profile. Alternatively, the backup application 102 may send the features 104 to the data analysis module 116 in order to entirely estimate the risk of data loss of the client data 122. The risk profile is then considered by the backup application 102 in modifying or generating a backup plan.

Figure 2:
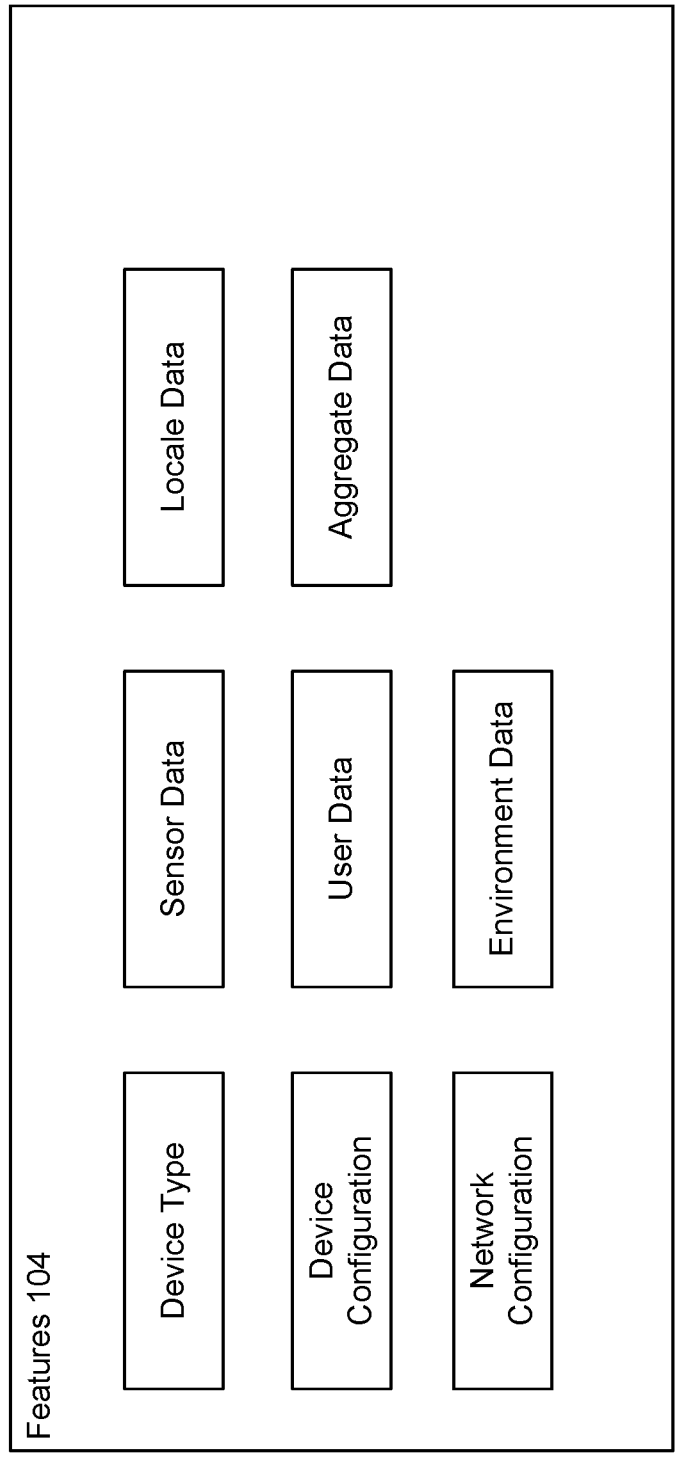
FIG. 2 is a block diagram of features considered by the system in accordance with exemplary aspects of the present disclosure.

In some aspects, the features 104 are related to the computing device 101, the client data 122, and environment data of the computing device 101. FIG. 2 illustrates several possible features that are considered by the backup application 102. For example, the features 104 may comprise at least device type, device configuration, network configuration, sensor data, user data, environment data, locale data and aggregate data such as helicopter view stats (e.g., high level statistics of data usage), and more. In one aspect, device type may include whether the computing device 101 is a notebook, a desktop PC or the like. In one aspect, device configuration may include hardware configuration such as hard disk drives and/or solid state drives installed in the computing device 101, parameters/types of such devices, operating system of the device, parameters thereof and the like. Additionally, the network configuration may indicate the type of network(s) the computing device 101 is coupled to, the type of interface used in the connection, speed of the connection and the like. Sensor data may comprise any smart devices or Internet-of-Things (IoT) devices coupled to the computing device 101 or the network of the computing device 101. User/client data 122 may comprise the data that is being backup itself, in addition to other data on the computing device 101 such as application specific data, system data or the like. Environment data relates to the environment where the computing device 101 is located, such as temperature/fluctuation in temperature of a room in a facility housing the computing device 101 and/or average temperature or fluctuations of temperature of the facility itself, location of the facility, time zone of the facility, number of devices housed in the facility and the like. Finally, aggregate data may comprise an aggregate metric that combines all aspects of user behavior over a period of time.

Figure 3:
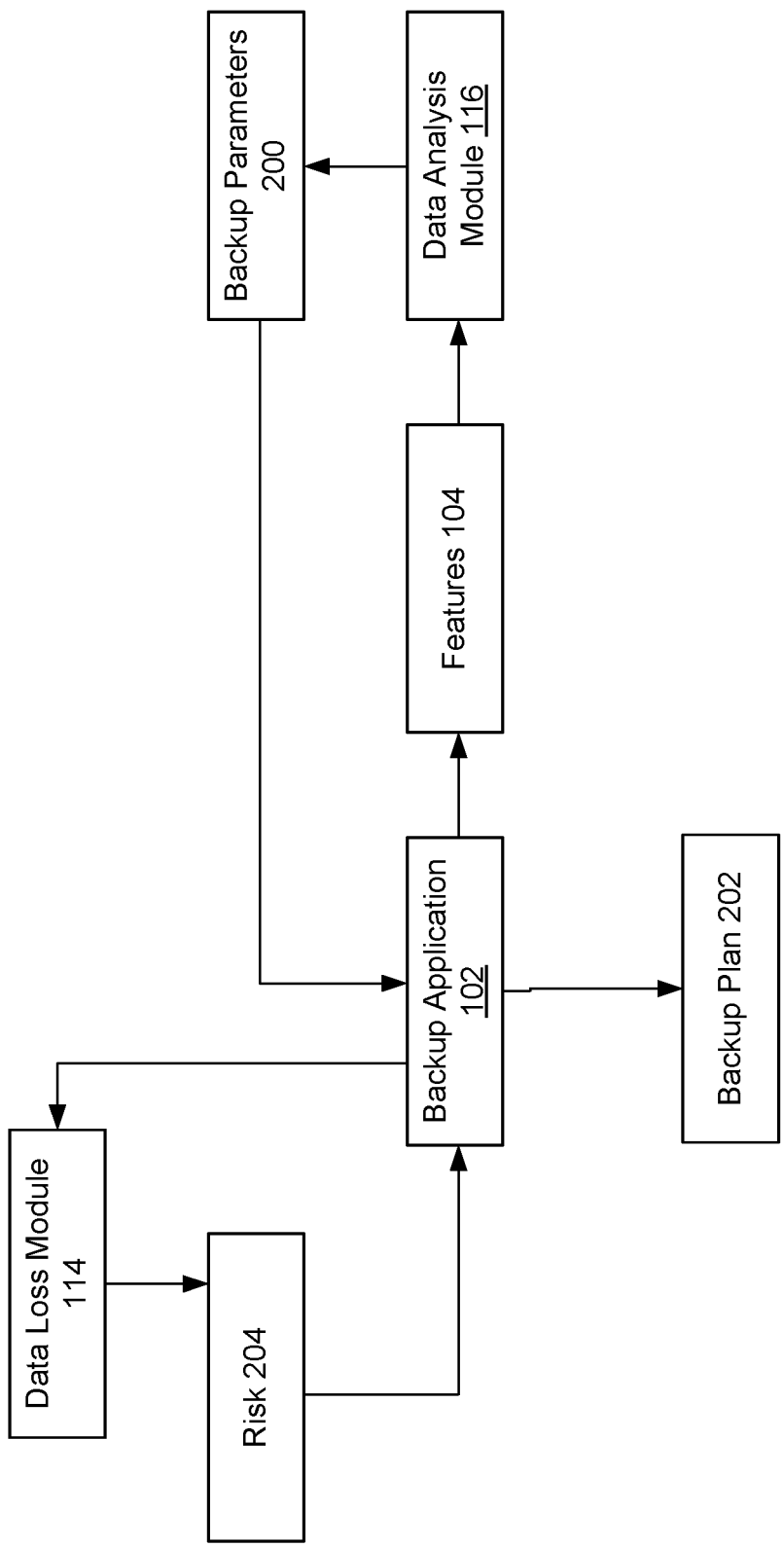
FIG. 3 is a block diagram of the backup application in accordance with exemplary aspects of the present disclosure.

FIG. 3 is a block diagram of the backup application 102 in accordance with exemplary aspects of the present disclosure.

According to one aspect of the disclosure, the backup application 102 collects features 104 associated with the computing device 101. Exemplary features are detailed above with respect to FIG. 1 and FIG. 2. In this aspect, the features 104 are collected and transmitted to the data analysis module 116, which may be collocated with the backup application 109, or located on a server.

The data analysis module 116 analyzes all of the features 104 (e.g., device information, environment information, data information and the like) to generate a set of backup parameters 200 for a backup plan. The backup parameters may indicate how often a backup is performed, the granularity of the backup (e.g., which data to backup, how frequently to backup particular types of data, how many backups of the data to be stored, and the like), the destination for the backup (e.g., high, medium, or low-level criticality storage locations), and the like. In some aspects, if the features indicate that the data to be backed up is critical, the backup parameters may comprise an indication that tier 1 storage is to be used. Similarly, if the data analysis module 116 determines that the features indicate that a portion of the data is non-critical, then the backup parameters may comprise an indication that a lower tier storage should be used, or multiple tiers should be used. The backup application 102 receives the backup parameters 200 and generates a backup plan 202, which may be suggested to a user of the computing device, or implemented for backup of the client data 122 automatically, as predetermined by an administrator of the computing device 101 or a network of the computing device 101. Alternatively, the backup plan 202 may replace an existing backup policy associated with the computing device 101, and/or devices with data and characteristics similar to the computing device 101.

In some aspects, the backup application 102 queries a data loss module 114 to generate a risk 204 of the client data 122 based on the features 104. The risk 204 represents a value corresponding to the risk that the data might be lost at the computing device 101. The data loss module 114 may take several risk variables into account such as a portion of the features 104, other environmental variables or external variables. The backup application 102 may suggest changes to the backup plan 202 according to the risk 204. In one example, the data loss module 114 determines that the client data indicates that a calendar of a user of the computing device 101 shows that the user is leaving the office for an external meeting. The data loss module 114 then increases the risk 204 of data loss. The backup application 102 then schedules a backup plan 202 or modifies an existing backup plan prior to the user leaving for the meeting, or scheduled out-of-office days.

According to another example, the data loss module 114 analyzes a temperature feature surrounding the computing device 101 and determines that the temperature has risen above an average value observed previously, or another indication that a malfunction or electricity shutdown is predicted. Those of ordinary skill in the art will recognize that the examples of risk described here are not limited by this disclosure, but may extend to any circumstance where a risk of data loss exceeds a predetermined threshold value or is established via statistical analysis, or the risk information is received directly. Accordingly, the risk 204 of data loss increases and the backup application 102 modifies or generates the backup plan 202 to perform a backup within a specified upcoming period of time. The ML engine 112 may also be queried to determine if patterns identified in the features 104 have occurred before and have led to loss of data. Thus the ML engine 112 can be used to predict increases or decreases in the risk of data loss. Accordingly, the data loss module 114 may increase the risk of loss 204, and the backup application 102 may modify the backup plan 202 to accommodate for the increased or decreased risk of loss by adjusting the schedule of the backup or the immediacy of the backup.

In another aspect of the present disclosure, the backup application 102 may suggest to a user of the computing device 101 a list of files to backup to remote storage (e.g., in the cloud), and another list of files to keep on a local storage device on the computing device. The backup application 102 may consider the access of the files and the importance of the files to determine the storage suggestions. In some aspects, a usage pattern indicating frequently accessed documents are automatically archived to a lower tier and automatically de-archived based on access.

Figure 4:
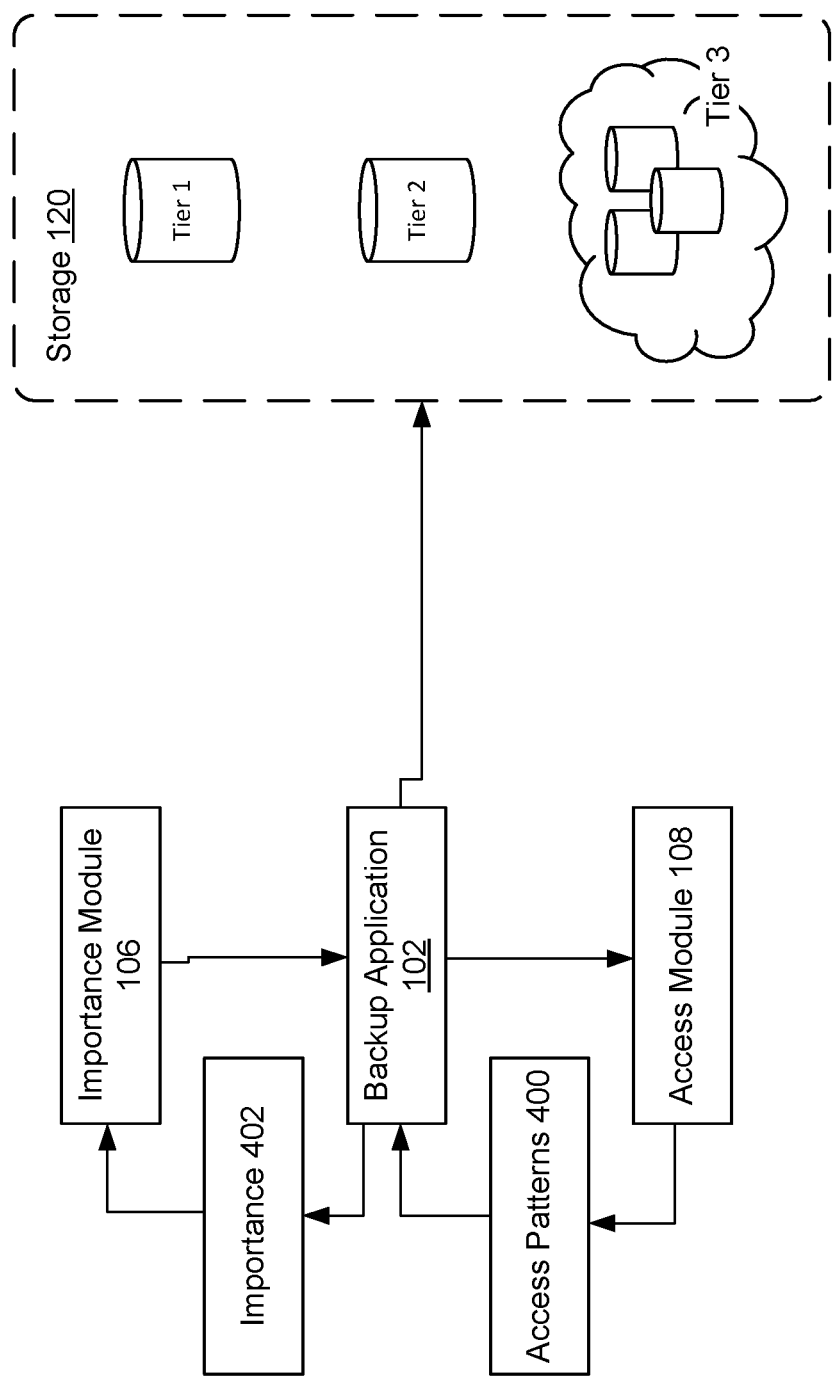
FIG. 4 is another block diagram of the backup application in accordance with exemplary aspects of the present disclosure.

FIG. 4 is another block diagram of the backup application 102 in accordance with exemplary aspects of the present disclosure.

In this aspect of the disclosure, the backup application 102 considers access patterns 400 and importance 402 of the client data 122 when predicting an optimal backup plan. In another aspect, the access patterns 400 and the importance 402 are taken into consideration when generating the backup parameters 200 which then are used to generate the backup plan 202. In FIG. 4, the backup application 102 queries the access module 108 for the access patterns 400. The access module 108 observers the client data 122 and records the access patterns of the user to the client data. For example, the access patterns 400 may indicate which portions of data are accessed more often verses less often. Further the access patterns 400 may indicate particular times that the portions of data are accessed, by which users or applications they are accessed, and any other relevant data which may impact how the data is backed up.

Similarly, the importance module 106 calculates an importance 402 of the client data 122. The importance 402 may, in some aspects, be based on the access patterns 400. Namely, data that is accessed more often is of more importance that data that is accessed less often. Further, the importance 402 also may take into account attributes of the file within the client data 122, such as the type, size, owner and the like. The importance 402 may also be further determined based on contents of the file using keyword search (e.g., semantic analysis) and analytics in addition to the access patterns 400. The backup application 102 then reconfigures the backup parameters 200 based on the access patterns 400 and the importance 402. The importance module 106 may also request a comparison between contents of the file and the segmentation/clustering of keywords that has been previously performed by the ML Engine 112 in order to calculate a more accurate and relevant importance of the file based on aggregate importance determinations.

The backup parameters 200 may comprise an indication of which tier of storage to store the data—for example high importance documents are stored in tier 1 while low importance documents are stored in tier 3. Each of the tiers may have their own set of parameters such as access times, redundancy and the like when considering which tier of storage in storage 120 they belong to. The backup application 102 then generates or modifies the backup plan based on the backup parameters 200 and may automatically perform the backup of client data 122 to storage 120. In some aspects, the backup application 102 suggests the backup plan to the user or administrator of computing device 101 in place of performing the backup automatically, and the user may or may not modify the suggested backup plan prior to performing a backup of the client data 122.

According to another aspect, the backup application 102 analyzes the content of files stored privately and data from personalized applications, for example, email and calendar information, to determine a risk of data loss. In one aspect, the features analyzed may include, at least, contents of Skype/Outlook messages, browsing history, and calendar meetings. In one example, if the backup application 102 determines that an email is received or sent regarding a business trip, the risk of data loss is increased and the backup application 102 predicts that a backup is needed. The backup application 102 then updates the backup plan so that a preliminary backup is performed prior to a user's departure. In this aspect, a predictive backup plan is generated based on a user's private data.

Figure 5:
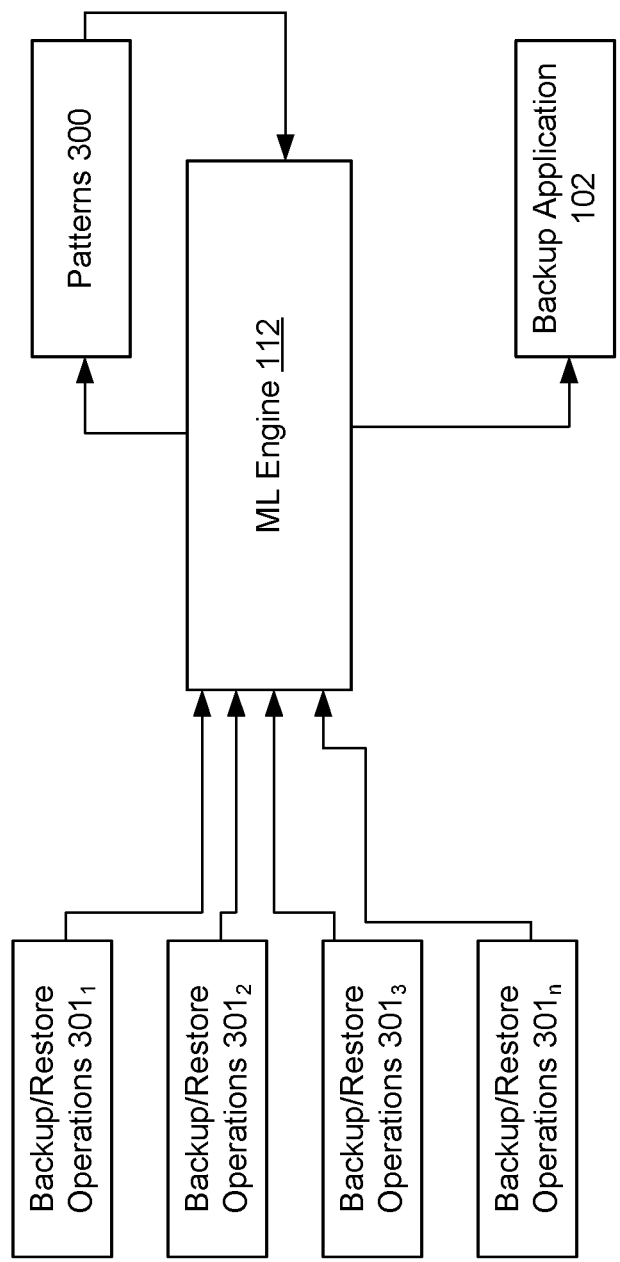
FIG. 5 is a block diagram of the Machine Learning (ML) Engine in accordance with exemplary aspects of the present disclosure.

FIG. 5 is a block diagram of the ML Engine 112 in accordance with exemplary aspects of the present disclosure.

According to one aspect of the disclosure, the ML Engine 112 actively monitors and collects all backup and restore operations, e.g. backup/restore operations $301_1$ to $301_n$ (collectively 301) that occur in a logical grouping of computing devices. In some aspects, the grouping comprises all devices within control of a company or enterprise, a group of companies, those devices using a particular backup application or the like. The ML Engine 112 clusters the backup and restore operations 301 into similar groups in order to establish various patterns 300 that are present in the data. For example, the ML Engine 112 may find patterns that show similarities within the clustered data in the entire population of devices and suggest new backup plans or modifications to existing backup plans to the backup application 102 (or each backup application installed on each device). In an alternative aspect, the ML Engine 112 generates backup plans and stores the backup plans in a database. The backup application 102 then accesses the database of backup plans and determines which backup plan meets the backup parameters 200. In this aspect, each individual backup application 102 can select the backup plans appropriate to their computing device features and apply the backup plans accordingly. In one aspect, the backup plans generated by the ML Engine 112 are compared to each other and balanced in order to conserve backup and storage resources based on the population of devices, thus enabling better management and conservation of resources.

The ML Engine 112 can further predict trends and scenario-based modeling, potential scheduling conflicts and resource contentions, and the impact of new workloads on backup infrastructure (physical capacity, network load, and device load). Further, the ML Engine 112 can be configured to store features corresponding to risk of data loss and use these correspondences to proactively identify issues before they escalate into outages and data loss that hurt business operations. The ML Engine 112 is relied upon by the backup application 102 for predictive analytics. In some instances, the ML Engine 112 continuously monitors and analyzes client data 122 to improve predictions and the generated backup plans so that resources within a population of devices, storage servers and the like are balanced within a threshold.

Figure 6:
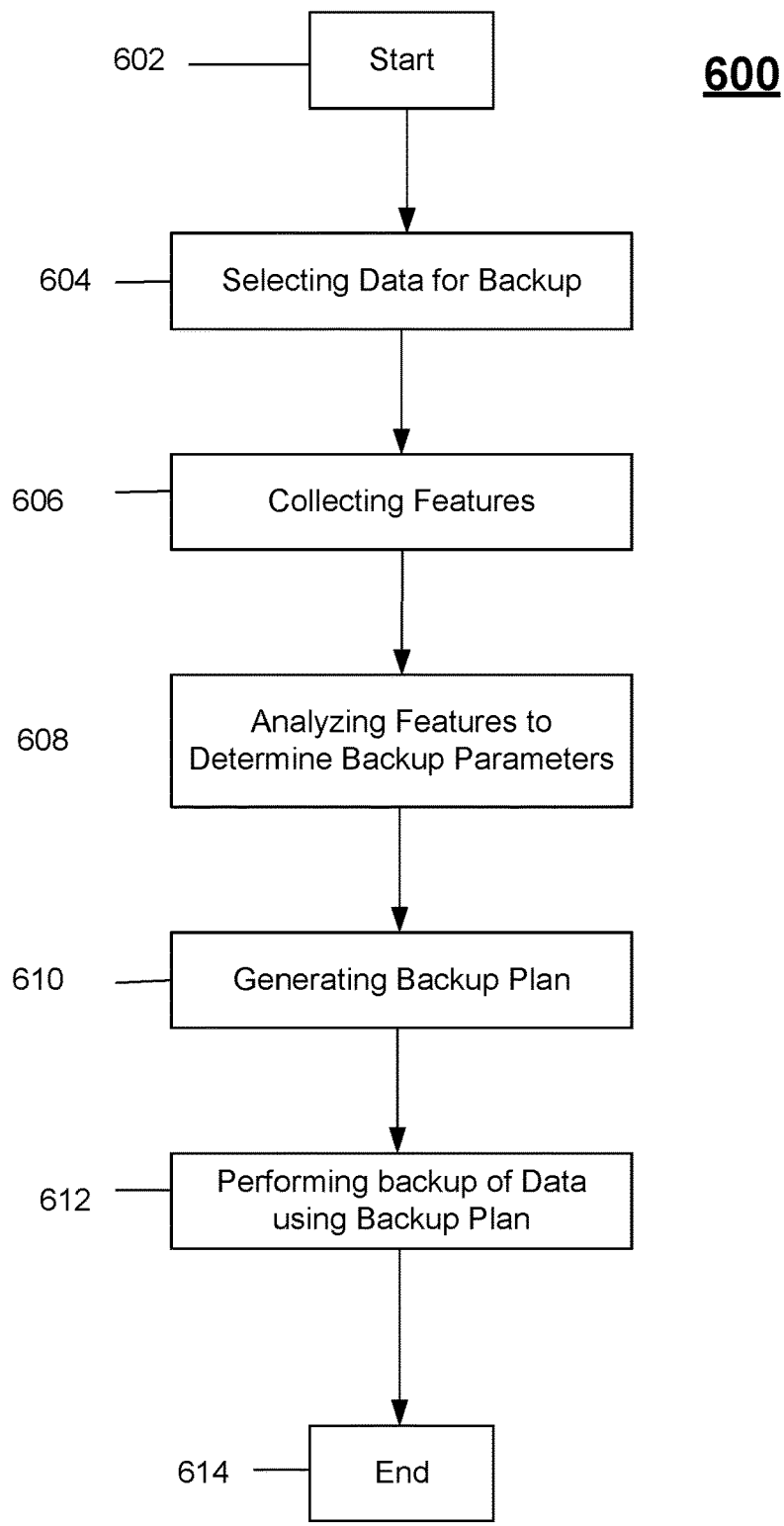
FIG. 6 is a flowchart for a method for predictive data protection in accordance with exemplary aspects of the present disclosure.

FIG. 6 is a flowchart for a method 600 for predictive data protection in accordance with exemplary aspects of the present disclosure. The method 600 is an exemplary implementation of the backup application 102 as executed by a hardware processor (such as processor 21 shown in FIG. 9) in accordance with exemplary aspects of the present disclosure.

The method 600 begins at step 602 and proceeds to step 604.

At step 604, the backup application selects the data for backup (e.g., client data 122). In some aspects this data is predetermined by a user of the computing device 101, while in other aspects, the data is predetermined by a security policy of the network or of an administrator of the computing device 101.

At 606, the method collects features associated with the computing device 101. As described above, these features include not only metadata about the client data 122, but information about the computing device 101 itself such as hardware, hardware configuration, locale, facility information and other environmental information (e.g., working environment information). See FIGS. 1 and 2, and the accompanying text for further detail.

At 608, the method 600 analyzes the collected features to determine a set of backup parameters. The backup parameters may indicate a frequency of backup, preliminary backups, immediacy of a backup, granularity of the backup, target storage destination and the like.

Subsequently, the method proceeds to 610 where the method generates a backup plan based on the backup parameters determined in 608. The backup plan dictates how the client data is stored in storage, which storage the data is stored to and other information included in the backup parameters. According to one aspect, instead of generating the backup plan, a database containing backup plans is queried to select a backup plan which conforms to the determined backup parameters. In this aspect, one or more backup plans is retrieved.

At 612, the method 600 performs the backup of data using the selected backup plan. The method terminates at step 614.

Figure 7:
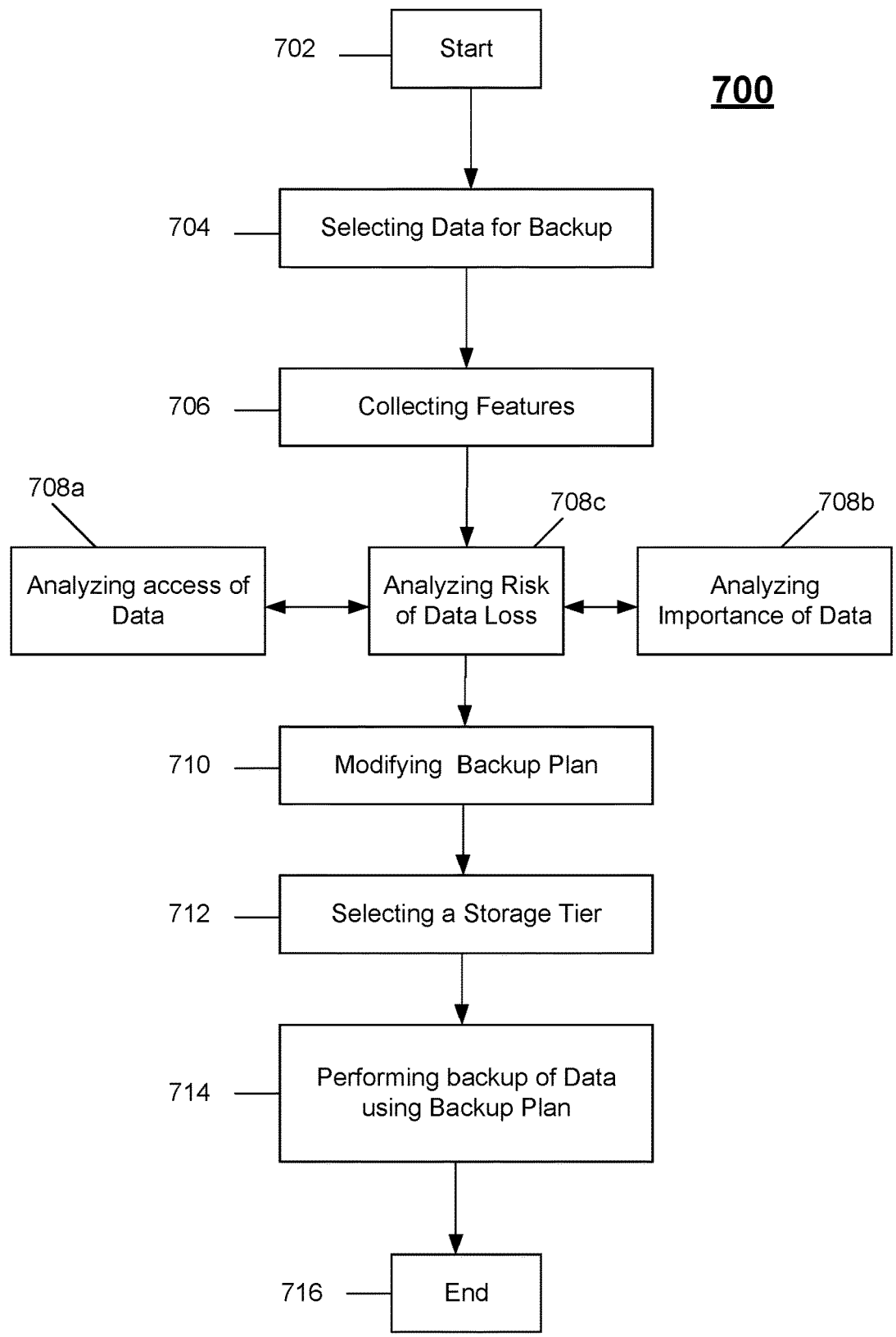
FIG. 7 is a flowchart for a method for modifying a backup plan in accordance with exemplary aspects of the present disclosure.

FIG. 7 is a flowchart for a method for modifying a backup plan in accordance with exemplary aspects of the present disclosure.

The method 700 begins at step 702 and proceeds to 704.

At step 704, the backup application selects the data for backup (e.g., client data 122). In some aspects this data is predetermined by a user of the computing device 101, while in other aspects, the data is predetermined by a security policy of the network or of an administrator of the computing device 101.

At 706, the method collects features associated with the computing device 101. As described above, these features include not only metadata about the client data 122, but information about the computing device 101 itself such as hardware, hardware configuration, locale, facility information and other environmental information. See FIGS. 1 and 2, and the accompanying text for further detail.

The method then proceeds to 708a, 708b and 708c. In some aspects, each of these steps is performed, while in other aspects only one or more of these steps are performed. In step 708a, the method analyzes the access patterns of client data that was selected for backup. In step 708b, the importance of the data is analyzed, at least based on the access patterns of the data. In other aspects, the importance may be determined by the type of file, size of the file or the like. At 708c, the access and importance are analyzed to determine a risk of data loss for the client data.

The method proceeds to 710, where the backup plan is either modified or a new backup plan is generated. At step 714, the method selects a particular tier of storage based on the access/importance of the data and sets an indication of the tier in the backup plan. The backup of the client data is then performed according to the backup plan at 714.

The method terminates at step 716.

Figure 8:
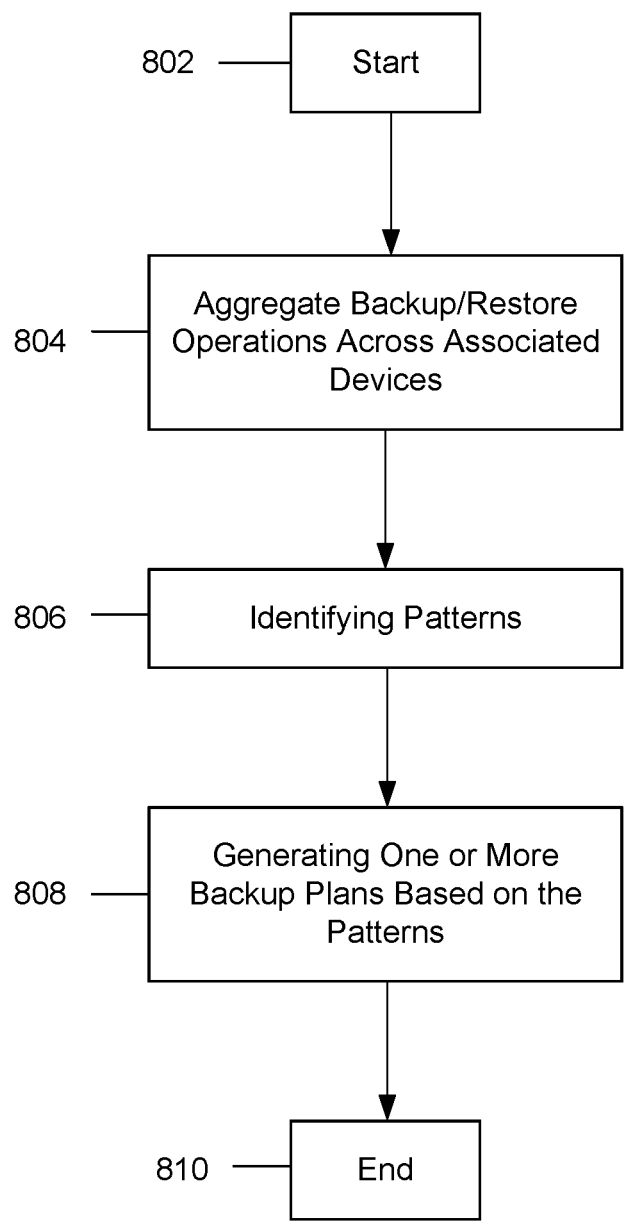
FIG. 8 is a flowchart for a method for creating a backup plan using machine learning in accordance with exemplary aspects of the present disclosure.

FIG. 8 is a flowchart for a method for creating a backup plan using machine learning in accordance with exemplary aspects of the present disclosure.

The method 800 begins at step 802 and proceeds to step 804

At step 804, the method 800 aggregates backup and restore operations across a population of associated devices. In some aspects, these devices are owned or controlled by the same company, the same individual, a group of companies, or have the same backup application installed thereon.

At 806, the method identifies patterns within the data. For example, the method may identify a plurality of files of a particular type and size being backed up according to a similar backup plan with similar backup parameters.

At 808, one or more backup plans are generated based on the identified patterns and, in some aspects, saved to a database of backup plans. One or more backup applications across the population of devices retrieves backup plans matching the determined backup parameters. In another aspect, instead of generating backup plans, the method modifies existing backup plans or the parameters of the existing backup plans to optimize backup solutions across a population of devices, efficiently managing the use of resources.

The method terminates at step 810.

Figure 9:
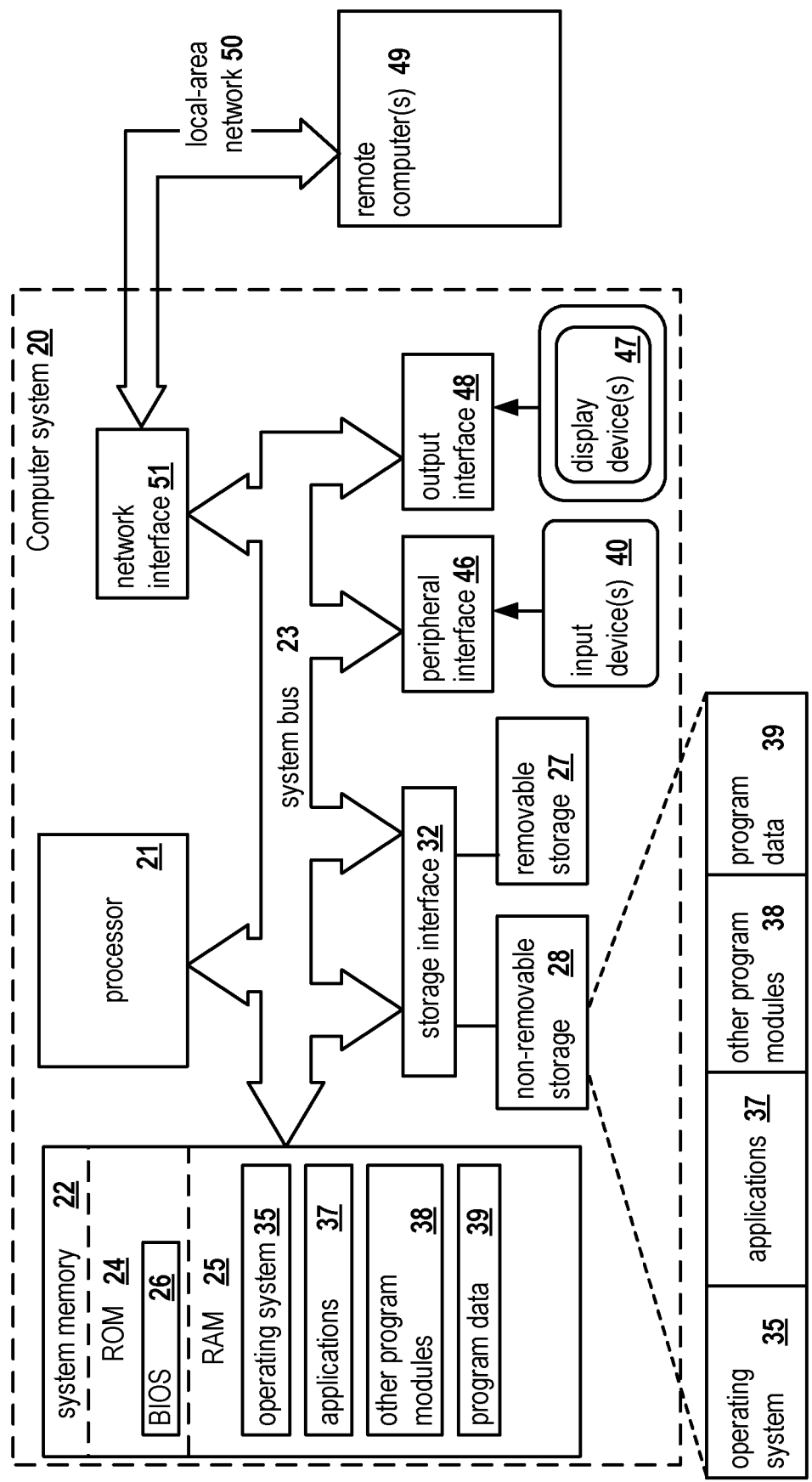
FIG. 9 is a block diagram of a general-purpose computer system on which the disclosed systems and method can be implemented.

FIG. 9 is a block diagram illustrating a computer system 20 on which aspects of systems and methods for predictive data protection may be implemented in accordance with an exemplary aspect. It should be noted that the computer system 20 can correspond to the various components of system 100, for example the computing device 101, the analysis server 110 and/or storage 120, or any components thereof, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 9, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein

What is claimed is:

1. A method for predictive data protection, comprising:
    selecting data stored on a computing device for backing up, according to a predetermined schedule for performing a backup;
    collecting features associated with the computing device where the data for the backup is stored, the features comprising device information for the computing device, user information for a user of the data, and external information associated with a locale of the computing device;
    analyzing the features to determine a set of backup parameters for the backup, wherein the backup parameters comprise scheduling parameters and destination storage parameters;
    aggregating backup and restore operations of the computing device with other computing devices within one or more networks;
    identifying patterns within the backup and restore operations;
    generating a backup plan based on the set of parameters for performing the backup and based on the patterns such that resources shared amongst the computing device and the other computing devices are balanced within a threshold while the backup plan is being executed; and
    performing the backup of the data according to the backup plan.

2. The method of claim 1, wherein the features comprise locale, hardware configuration, location, device type, time zone, OS, the amount of data utilized, helicopter view stats.

3. The method of claim 1, wherein the scheduling parameters comprise one or more of: how often to backup and granularity and the destination storage parameters comprise targets for the destination storage of the backup archives.

4. The method of claim 1, further comprising:
    estimating a risk of data loss based on a set of risk variables related to user data, device data and environment data; and
    suggesting a modification to the backup plan based on the risk of data loss.

5. The method of claim 4, wherein the set of risk variables comprises one or more of network device information, streaming data, computer sensor data and user behavior data.

6. The method of claim 4, wherein estimating the risk of data loss is further based on risk profiles of similar computing devices to the computing device and similar data to the data selected for backup.

7. The method of claim 1, further comprising:
    determining access patterns of the data by a user of the computing device;
    automatically backup the data according to the access patterns, wherein an amount of times the data is backed up in a given period of time is based on whether an amount of access times over the given period of time exceeds a threshold amount of times.

8. The method of claim 1, further comprising determining that a location of a user of the computing device will change during an upcoming event during an upcoming period of time, and scheduling the backup prior to the upcoming event.

9. The method of claim 8, wherein determining that the location of the user will change during the upcoming event further comprises detecting the upcoming event in communications associated with the user.

10. A system for predictive data protection, comprising:
    a processor configured to:
    select data stored on a computing device for backing up, according to a predetermined schedule for performing a backup;
        collect features associated with the computing device where the data for the backup is stored, the features comprising device information for the computing device, user information for a user of the data, and external information associated with a locale of the computing device;
        analyze the features to determine a set of backup parameters for the backup, wherein the backup parameters comprise scheduling parameters and destination storage parameters;
        aggregate backup and restore operations of the computing device with other computing devices within one or more networks;
        identify patterns within the backup and restore operations;

generate a backup plan based on the set of parameters for performing the backup and based on the patterns such that resources shared amongst the computing device and the other computing devices are balanced within a threshold while the backup plan is being executed; and perform the backup of the data according to the backup plan.

11. The system of claim 10, wherein the features comprise locale, hardware configuration (HDD/SSD, top-notch/medium class), location, device type: notebook/PC, time zone, OS, the amount of data utilized, helicopter view stats.

12. The system of claim 10, wherein the scheduling parameters comprise one or more of: how often to backup and granularity and the destination storage parameters comprise targets for the destination storage of the backup archives.

13. The system of claim 10, the processor further configured to:
   estimate a risk of data loss based on a set of risk variables related to user data, device data and environment data; and
   suggest a modification to the backup plan based on the risk of data loss.

14. The system of claim 13, wherein the set of risk variables comprises one or more of network device information, streaming data, computer sensor data and user behavior data.

15. The system of claim 10, the processor further configured to:
   determine access patterns of the data by a user of the computing device;
   automatically backup the data according to the access patterns, wherein an amount of times the data is backed up in a given period of time is based on whether an amount of access times over the given period of time exceeds a threshold amount of times.

16. A non-transitory computer readable medium storing thereon computer executable instructions for predictive data protection, including instructions for:
   selecting data stored on a computing device for backing up, according to a predetermined schedule for performing a backup;
   collecting features associated with the computing device where the data for the backup is stored, the features comprising device information for the computing device, user information for a user of the data, and external information associated with a locale of the computing device;
   analyzing the features to determine a set of backup parameters for the backup, wherein the backup parameters comprise scheduling parameters and destination storage parameters;
   aggregating backup and restore operations of the computing device with other computing devices within one or more networks;
   identifying patterns within the backup and restore operations;
   generating a backup plan based on the set of parameters for performing the backup and based on the patterns such that resources shared amongst the computing device and the other computing devices are balanced within a threshold while the backup plan is being executed; and
   performing the backup of the data according to the backup plan.

17. The non-transitory computer readable medium of claim 16, further comprising instructions for:
   estimating a risk of data loss based on a set of risk variables related to user data, device data and environment data; and
   suggesting a modification to the backup plan based on the risk of data loss.

* * * * *